US012568101B2

(12) United States Patent
Gibson et al.

(10) Patent No.: US 12,568,101 B2
(45) Date of Patent: Mar. 3, 2026

(54) NETWORK ANOMALY DETECTION

(71) Applicant: BRITISH TELECOMMUNICATIONS PUBLIC LIMITED COMPANY, London (GB)

(72) Inventors: Michael Gibson, London (GB); Alexander Healing, London (GB); Aditya Manocha, London (GB)

(73) Assignee: British Telecommunications Public Limited Company, London (GB)

( * ) Notice: Subject to any disclaimer, the term of this patent is extended or adjusted under 35 U.S.C. 154(b) by 72 days.

(21) Appl. No.: 18/581,779

(22) Filed: Feb. 20, 2024

(65) Prior Publication Data

US 2024/0283806 A1 Aug. 22, 2024

(30) Foreign Application Priority Data

Feb. 21, 2023 (EP) .................................... 23157824

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC .. H04L 63/1425; H04L 63/1441; H04L 63/20
See application file for complete search history.

(56) References Cited

U.S. PATENT DOCUMENTS 11,374,952 B1 * 6/2022 Coskun .................. G06N 3/045
11,509,674 B1 * 11/2022 Beauchesne ........ H04L 63/1425
12,292,971 B2 * 5/2025 Harang .................. G06F 21/56
2015/0326600 A1 * 11/2015 Karabatis ............... H04L 63/20 726/25

(Continued)

FOREIGN PATENT DOCUMENTS

CN 110430183 A 11/2019

OTHER PUBLICATIONS

"Combined Search & Exam Report for GB2302447.4", May 23, 2023, 5 pgs.

(Continued)

*Primary Examiner* — Thomas A Gyorfi
(74) *Attorney, Agent, or Firm* — EIP US LLP

(57) ABSTRACT

A computer-implemented method of training a network anomaly detection system is disclosed. The method involves generating synthetic benign network data and synthetic anomalous network data and combining the synthetic benign network data and synthetic anomalous network data to generate combined synthetic network data having a predetermined density of anomalous network data. The combined synthetic network data is provided to a trained anomaly detection model, and an accuracy score is determined that is representative of how accurately the trained anomaly detection model recognizes anomalous activity in the combined synthetic network data. If the accuracy score is less than a threshold value, the anomaly detection model is trained with additional network data and a new accuracy score is deter- (Continued)

mined. Otherwise, the predetermined density of anomalous network data is reduced and a new accuracy score is determined until a predetermined stopping criterion is met.

15 Claims, 4 Drawing Sheets

(56) References Cited

U.S. PATENT DOCUMENTS

| | | | | |
|---|---|---|---|---|
| 2016/0028753 | A1 | 1/2016 | Di Pietro et al. | |
| 2018/0159871 | A1 | 6/2018 | Komashinskiy et al. | |
| 2019/0075123 | A1* | 3/2019 | Smith | G06N 3/006 |
| 2021/0287071 | A1* | 9/2021 | Ben Fadhel | H04L 63/1425 |
| 2022/0014554 | A1* | 1/2022 | Vasu | H04L 63/20 |
| 2022/0060491 | A1 | 2/2022 | Achleitner et al. | |
| 2022/0156372 | A1* | 5/2022 | Harang | H04L 63/145 |
| 2023/0024796 | A1* | 1/2023 | Hazard | G06N 5/04 |
| 2023/0058516 | A1* | 2/2023 | Khanna | G06Q 40/02 |
| 2023/0164156 | A1* | 5/2023 | Grossman | F03D 17/00 726/22 |
| 2023/0179616 | A1* | 6/2023 | Rahmes | G06N 3/045 726/23 |

OTHER PUBLICATIONS

"The Extended European Search Report for EP23157824.6", Sep. 7, 2023, 7 pgs.

Sabari, KK , et al., "Anomaly-based Intrusion Detection using GAN for Industrial Control Systems", 2022 10th International Conference on Reliability, Infocom Technologies and Optimization (Trends and Future Directions) (ICRITO), Oct. 13, 2022, pp. 1-6.

Tang, Bo , et al., "KernelADASYN: Kernel Based Adaptive Synthetic Data Generation for Imbalanced Learning", Sendai, Japan: IEEE. Retrieved from https://ieeexplore.ieee.org/abstract/document/7256954, 2015, pp. 664-571.

Wan, Zhiqiang , et al., "Variational Autoencoder Base Synthetic Data Generation for Imbalanced Learning", Honolulu, USA: IEEE, 2017, 7 pgs.

* cited by examiner

401 — Train anomaly detection system

402 — Use the anomaly detection system to detect anomalous activity in real network data 403 — Perform mitigative action in response to detecting anomalous activity

NETWORK ANOMALY DETECTION

PRIORITY CLAIM

The present application claims priority from European Patent Application No. 23157824.6, filed Feb. 21, 2023, which is hereby fully incorporated herein by reference.

TECHNICAL FIELD

The present disclosure relates to network anomaly detection systems and methods of training network anomaly detection systems.

BACKGROUND

Network anomaly detection systems, such as Intrusion Detection Systems (IDSs) and Intrusion Prevention Systems (IPSs), are physical or virtual systems that monitor network traffic in computer networks in order to detect anomalous network activity such as network faults or malicious behavior.

Anomalous patterns in network data can often be drowned out by normal, benign network traffic. For examples, traditional IDSs and IPSs work around heuristic rules that identify malicious behaviors based on identifying particular types of network traffic behavior. However, such systems are susceptible to missing attacks that use stealthy techniques to evade detection. In addition, heuristic systems rely on knowledge of previously observed attacks in order to detect new attacks, which makes them ineffective at detecting attacks that exploit unknown vulnerabilities.

There is a need for improved anomaly detection systems that are resilient to both stealthy attacks and attacks that exploit new vulnerabilities.

SUMMARY

According to a first aspect, there is provided a network anomaly detection system configured to: generate synthetic benign network data and synthetic anomalous network data; combine the synthetic benign network data and synthetic anomalous network data to generate combined synthetic network data having a predetermined density of anomalous network data; provide the combined synthetic network data to a trained anomaly detection model; determine an accuracy score representative of how accurately the trained anomaly detection model recognizes anomalous activity in the combined synthetic network data; and perform one of: responsive to determining that the accuracy score is less than a threshold value, train the anomaly detection model with additional network data and then repeat the providing, the determining, and the performing, otherwise reducing the predetermined density of anomalous network data and repeating the combining, the providing, and the determining until a predetermined stopping criterion is met.

By training the anomaly detection model with a range of densities of anomalous network data, the network anomaly detection system of the first aspect is capable of detecting even the sparsest of anomalous traffic patterns.

The anomaly could be any type of atypical network behavior, such as a cyberattack/intrusion, hardware/software fault, excessive network load, etc.

The network anomaly detection system may be an intrusion detection system or an intrusion prevention system, and the anomalous network data may be malicious network data. Synthetic data refers to data that has been artificially generated rather than collected by observing real-world events. Benign network data (or network traffic data) refers to network traffic data in the absence of any anomalous or malicious activity. Anomalous network data (or network traffic data) refers to network traffic data in which a network is experiencing/undergoing an abnormal/anomalous behavior, e.g. a network fault or cyberattack.

The accuracy score may be any quantity capable of representing how accurately the trained anomaly detection model recognizes anomalous activity in the combined synthetic network data. Various techniques could be used to determine the accuracy score, including a ratio of correct to total predictions, precision, recall or F1-score values.

Any suitable stopping criterion may be used. Non-limiting examples of stopping criteria include reaching a predetermined minimum density of anomalous network data, reaching a predetermined number of iterations of the method, and reaching a predetermined time limit. Alternative stopping criteria could also be used, and multiple stopping criteria could be used simultaneously (e.g. the method could terminate when one or all of multiple stopping criteria are satisfied). Compliance with the stopping criterion could be assessed at any stage—for example it could be assessed prior to reducing the predetermined density of anomalous network data, or it could be assessed throughout the process.

The anomaly detection model may be any suitable machine learning model. Various machine learning models could be used as the anomaly detection model, and the choice of model may depend upon factors such as cost/performance requirements and the type of anomaly or malware being detected. Examples of suitable models include logistical regression models, random forest models and deep learning models. The model may be trained using any suitable training technique, including supervised and/or unsupervised training methods using previously obtained network data, which may contain both benign and anomalous network data, optionally at varying densities.

The synthetic benign network data may optionally be generated using a generative data model with real-world benign network data. Examples of suitable generative data models include variational autoencoders (VAEs) and generative adversarial networks (GANs).

The predetermined stopping criterion may optionally be a predetermined minimum density of anomalous network data. For example, the predetermined minimum density may be chosen based on the minimum expected density of anomalous network data in real-world network faults or cyberattacks.

The additional network data can comprise anomalous network data. The additional network data may be real-world network data, synthetic network data, or a combination thereof.

Training the anomaly detection model with additional network data may optionally comprise training the anomaly detection model with training data having the predetermined density of anomalous network data. In other words, the density of anomalous network data in the additional network data may optionally be equal to the predetermined density of anomalous network data in the combined synthetic network data. Training the training the anomaly detection model with training data having the predetermined density of anomalous network data ensures that the anomaly detection model becomes more effective at detecting anomalies (e.g. cyberattacks) having the predetermined density of anomalous network data.

The network anomaly detection system may be further configured to use the anomaly detection model to detect anomalous activity in real network data subsequent to the training or the reducing. Real network data refers to real-world network traffic data (i.e. non-synthetic network data).

The network anomaly detection system may further comprise an anomaly response system (such as an intrusion response system) configured to perform a mitigative action in response to detection of the anomalous activity. The mitigative action in question will depend upon the nature of the detected anomalous activity. Selection of an appropriate mitigation action could use any suitable technique, such as rule-based methods (e.g. using a lookup table), heuristic methods, or machine learning methods (e.g. using a machine learning intrusion response system).

According to a second aspect, there is provided a computer-implemented method of training a network anomaly detection system, the method comprising: generating synthetic benign network data and synthetic anomalous network data; combining the synthetic benign network data and synthetic anomalous network data to generate combined synthetic network data having a predetermined density of anomalous network data; providing the combined synthetic network data to a trained anomaly detection model; determining an accuracy score representative of how accurately the trained anomaly detection model recognizes anomalous activity in the combined synthetic network data; and performing one of: responsive to determining that the accuracy score is less than a threshold value, training the anomaly detection model with additional network data and then repeating the providing, the determining, and the performing, or reducing the predetermined density of anomalous network data and repeating the combining, the providing, and the determining until a predetermined stopping criterion is met.

The method of the second aspect corresponds to the method performed by the anomaly detection system (e.g. intrusion detection system) of the first aspect and provides corresponding benefits.

The synthetic benign network data may be generated by a generative data model using real-world benign network data.

The predetermined stopping criterion may be a predetermined minimum density of anomalous network data.

Training the anomaly detection model with additional network data may comprise training the anomaly detection model with training data having the predetermined density of anomalous network data.

According to a third aspect, there is provided a computer-implemented anomaly detection method comprising: training an anomaly detection system (e.g. an intrusion detection system) using the method of any preceding method claim; and subsequent to training the anomaly detection system, using the anomaly detection system to detect anomalous activity in real network data.

The method may further comprise performing a mitigative action in response to detecting the anomalous activity.

The anomaly detection system of the first, second or third aspects may be an intrusion detection system. When the anomaly detection system is an intrusion detection system, the anomalous network data will be malicious network data (i.e. network traffic data when the network is experiencing a cyberattack), the anomalous activity will be malicious activity, the anomaly detection model will be an intrusion detection model, and the anomaly response system will be an intrusion response system.

According to a fourth aspect, there is provided a computer program comprising instructions which, when executed by a computer, cause the computer to carry out the second aspect.

A computer readable carrier medium comprising the computer program of the fourth aspect may also be provided.

BRIEF DESCRIPTION OF THE FIGURES

Aspects of the present disclosure will now be described by way of example with reference to the accompanying figures, in which.

DETAILED DESCRIPTION

Network faults and cyberattacks can be difficult to detect. Cyber attackers are adopting increasingly stealthy approaches to gain access to networks in a highly covert manner. Attackers often achieve their goal by using behaviors (e.g. irregular network traffic patterns) that are neither obvious to a human analyzing network logs nor effectively detected or prevented by intrusion detection systems (IDSs) and intrusion prevention systems (IPSs).

An existing method for creating an IDS is to apply machine learning (ML) on historical network traffic data that includes traffic data corresponding to malicious attacks. Whilst this technique can lead to accurate detection, it relies upon identifying similar patterns in live data, which rarely occurs in real-world attacks (especially when attackers employ stealthy tactics). In addition, such machine learning techniques also rely upon having an ample supply of training data containing examples of such malicious behavior.

The present disclosure improves the robustness of network anomaly detection systems, such as machine learning IDSs, by dynamically adjusting the density of anomalous behavior in the training and test data. The training and test data are obtained from a combination of data generators and sources of real-world data from actual network anomalies (e.g. attacks), and the density is adjusted based on the performance of the ML model (i.e. how well the ML model detects anomalous behavior from different test sets containing different densities of anomalous behavior). This performance (represented by an accuracy score) provides an indication of how effective an ML model is depending at detecting varying densities of anomalous data such that additional training can be provided where necessary.

Figure 1:
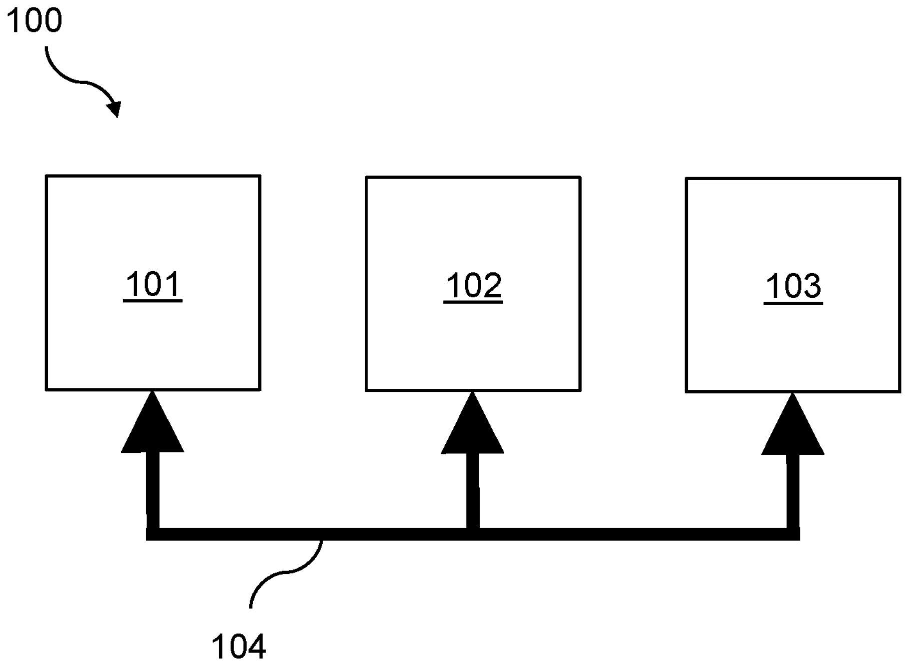
FIG. 1 is a schematic of a data processing apparatus.

FIG. 1 schematically illustrates an exemplary data processing apparatus 100 capable of performing any of the methods described herein. The data processing apparatus 100 may be an anomaly detection system (e.g. an intrusion detection/prevention system), or it may be another computing system on which an anomaly detection system (e.g. an intrusion detection/prevention system) is installed. The data processing apparatus 100 comprises a processor 101 operably coupled to both a memory 102 and an interface (I/O) 103 via a bus 104.

The memory 102 may optionally comprise computer program instructions which, when the program is executed by the processor 101, cause the data processing apparatus 100 to carry out any of the methods described herein. Alternatively or additionally, the interface 103 can optionally comprise one or both of a physical interface configured to receive a data carrier having such instructions stored thereon and a receiver configured to receive a data carrier signal carrying such instructions.

The receiver, when present, can be configured to receive messages. It can comprise one or more wireless receiver modules and/or one or more wired receiver modules. The interface 103 can optionally comprise a transmitter configured to transmit messages. The transmitter, when present, can comprise one or more wireless transmitter modules and/or one or more wired transmitter modules.

Figure 2:
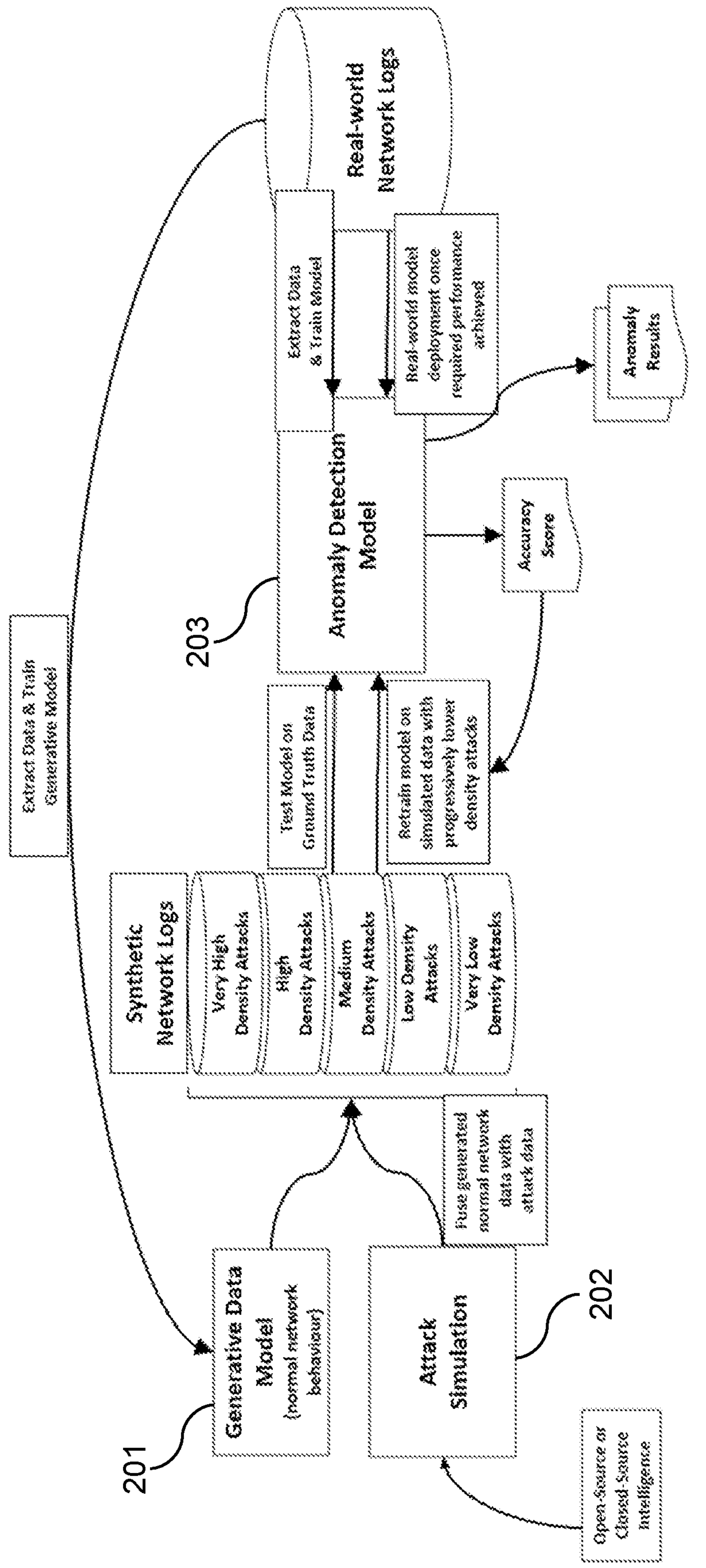
FIG. 2 is a schematic of an anomaly detection framework.

A schematic of an exemplary anomalous detection framework is illustrated in FIG. 2. Generative data model 201 takes input from real-world network logs and generates synthetic (and, for example, non-confidential) benign network data (i.e. data representative of normal/non-anomalous network traffic). The generative data model 201 could optionally be a variational autoencoder (VAE) or a generative adversarial network (GAN) or a combination therefore that learns what benign background traffic patterns look like in real-world traffic and then use this knowledge to generate similar synthetic benign network data mimicking the real-world benign network traffic. To ensure that the model is based on the real-world, a subset of real-world network logs may optionally be part of the output from the generative data model 201.

An attack simulation component 202 (such as the Keysight BreakingPoint System) is used generate synthetic malicious network data. The knowledge of these attack patterns may be derived from open-source or closed-source intelligence or a combination thereof. Open-source and closed-source intelligence sources provide not just network packet-level details of real-world attacks, but these sources also provide information regarding techniques or traffic patterns that attackers try and use to evade detection from heuristic or rule-based intrusion detection/prevention systems. While FIG. 2 generates synthetic anomalous network data in the form of synthetic malicious network data, it should be understood that the same techniques apply more generally to all types of anomalous network data. Accordingly, the attack simulation component 202 could be replaced with a more general anomaly simulation component.

Different attack variants ranging from high density to low density can then be generated by combining the synthetic benign network data generated by the generative data model 201 with the synthetic malicious network data generated by the attack simulation component 202. The varying density of malicious data in the generated combined synthetic network data facilitates the generation of a rich dataset with different possible scenarios that an attacker might make use of to penetrate into secure networks. The data generated by the generative data model 201 and the attack simulation component 202 could be combined in an iterative fashion starting from a very high density of attack data that might constitute a 9:1 attack to benign traffic ratio for instance to a very low density of attack data that might constitute 1:9 attack to benign traffic ratio for instance.

The combined synthetic network data is fed into an anomaly detection model 203 (e.g. an intrusion detection model) that is initially trained on real-world network logs. The type of anomaly detection model 203 used will depend upon the desired sophistication and the details of the type of malicious behavior being detected, but the anomaly detection model 203 will generally be a machine learning model. The type of model used could range from logistical regression and random forests to models based on deep learning techniques.

The performance of the anomaly detection model 203 is assessed using varying densities of attack data: the density of attack data in the combined synthetic network data is varied dynamically depending upon how the anomaly detection model 203 performs with progressively lower attack densities in the generated datasets. An accuracy score is determined for each synthetic dataset processed by the anomaly detection model 203, and the accuracy score is used to determine if there is a need for additional training/retraining the model before it is deployed in a real-world scenario. The accuracy score can be any suitable metric that represents the accuracy of the anomaly detection model 203 at detecting threats in the synthetic attack data. For example, the accuracy score could be a ratio of correct to total predictions, or it may be based on precision, recall or F1-score values. The iterative training of the model with progressively lower density of attacks and monitoring the accuracy score allows the anomaly detection model 203 to be trained and tested in parallel until performance reaches the required threshold.

An example will now be given in the context of a TCP SYN port scan attack. A TCP SYN port scan attack is a common technique that is used by attackers to perform reconnaissance of a target network. This reconnaissance can help attackers obtain information about the target network, including details about hosts, operating systems, open ports and active services.

A common technique to block such port scan attacks is using traditional intrusion detection/prevention systems to detect and block traffic patterns when a rule is triggered. Such traditional methods can fail when attackers use sufficiently stealthy evasion strategies or different variations of port scans like Fin Scan, Null scan or Xmas scan. By training an anomaly detection model with varying densities of attack data using the framework described above, the anomaly detection model 203 of the present disclosure can detect even the stealthiest of port scan attacks.

When training the anomaly detection model 203 to detect TCP SYN port scan attacks, the attack simulation component 202 generates synthetic attack data based on gathered intelligence of different variants and evasion techniques that adversaries use to launch TCP SYN port scan attacks. The anomaly detection model 203 is initially trained on the real-world data, and it is then tested against TCP SYN port scan data generated by the generative data model 201 and the attack simulation component 202. For example, synthetic data may be generated with an attack data packet rate (density) ranging from 0.1 pps (packets per second) to 1000 pps. The anomaly detection model 203 is then tested with successively sparser attack data. If the resulting accuracy score for a given attack data density (rate) is sufficiently high (e.g. if it exceeds a predetermined threshold value), then the test proceeds to the next densest dataset. Otherwise (e.g. if the accuracy score is below a predetermined threshold value) the anomaly detection model 203 will be retrained/provided with additional training (e.g. with real or synthetic training data having an attack data density equal to the density of the data which resulted in the insufficient accuracy score) and subsequently retested with new synthetic test data until the desired performance is achieved.

Figure 3:
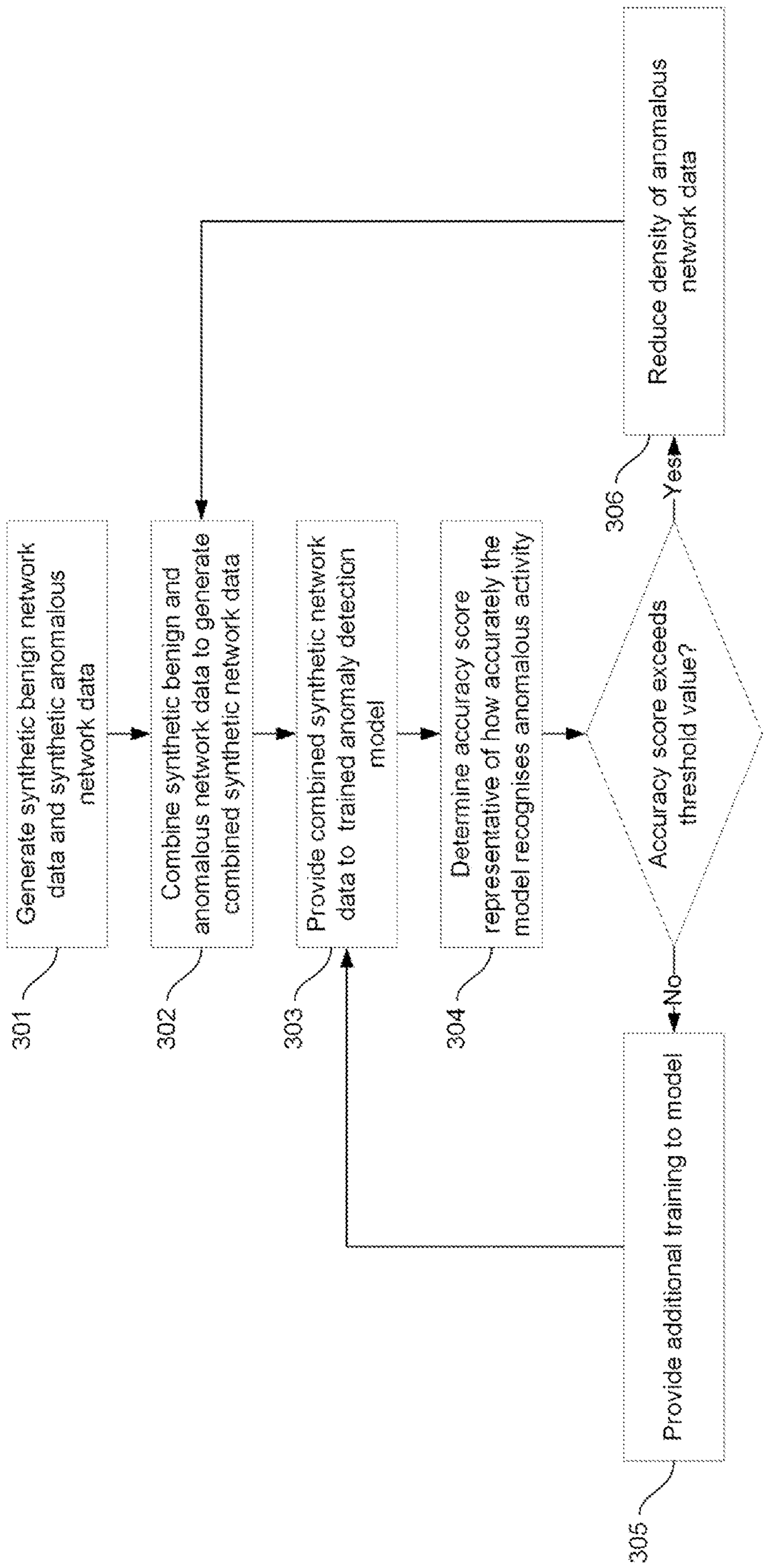
FIG. 3 is a flowchart of a method for training an anomaly detection system.

FIG. 3 shows a method for training a network anomaly detection system (e.g. the method performed using the intrusion detection framework shown in FIG. 3 and described above). In 301, synthetic benign network data and synthetic anomalous network data are generated. The synthetic benign network data may be generated by a generative data model as described above, and it may be generated based on real-world (i.e. non synthetic) benign network data. Any suitable synthetic data generation technique may be used, such as a variational autoencoder (VAE) or a generative adversarial network (GAN) or a combination of the two. The synthetic anomalous network data may likewise be generated by any suitable technique, such as an attack simulation component as described above.

In 302, the synthetic benign network data and synthetic anomalous network data are combined to generate combined synthetic network data having a predetermined density of anomalous network data. The predetermined density may be selected based on various factors such as an anticipated and/or desired performance of the network anomaly detection system.

In 303, the combined synthetic network data is provided to a trained anomaly detection model (e.g. an intrusion detection model). Various machine learning models could be used as the anomaly detection model, and the choice of model may depend upon factors such as cost/performance requirements and the type of anomaly/malware being detected. Examples of suitable models include logistical regression models, random forest models and deep learning models. The model may be trained using any suitable training technique, including supervised and/or unsupervised training methods using previously obtained network data, which may contain both benign and anomalous network data, optionally at varying densities.

In 304, an accuracy score is determined that is representative of how accurately the trained anomaly detection model recognizes anomalous activity in the combined synthetic network data. Various techniques could be used to determine the accuracy score, including a ratio of correct to total predictions, precision, recall or F1-score values. The accuracy score can be any quantity capable of representing how accurately the trained anomaly detection model recognizes anomalous activity in the combined synthetic network data.

If the accuracy score is less than a predetermined threshold value (which may be set based on e.g. a desired performance of the model), additional training is provided to the anomaly detection model in 305. The training data used to provide the additional training may be real-world data or synthetic data, and it may optionally have an anomalous network data density equal to the predetermined density of anomalous network data (the model could optionally be trained using the combined synthetic network data generated in 302). Following 305, the method returns to 303 so that an updated accuracy score can be determined for the anomaly detection model. Operations 301 and 302 may optionally be repeated prior to determining the updated accuracy score; this is especially important if the model has been trained using the previously generated synthetic data, because the model should not be tested using the same data used to train it.

If it is determined that the accuracy score is greater than a predetermined threshold value, the predetermined density is reduced, and the method returns to 302 in order to generate new combined synthetic network data having the updated (reduced) predetermined density of anomalous network data. The level of reduction may be predetermined (i.e. the method may iterate through a predetermined list of density values), or it may be reduced by a predetermined proportion (e.g. reduced by 10%, 50%, 90% etc.). Operation 301 may optionally be repeated prior to generating the new combined synthetic data, although it is also possible to combine the previously generated synthetic network data at a new ratio.

The method terminates when a predetermined stopping criterion is satisfied. Non-limiting examples of stopping criteria include reaching a predetermined minimum density of anomalous network data, reaching a predetermined number of iterations of the method, and reaching a predetermined time limit. Alternative stopping criteria could also be used, and multiple stopping criteria could be used simultaneously (e.g. the method could terminate when one or all of multiple stopping criteria are satisfied).

Figure 4:
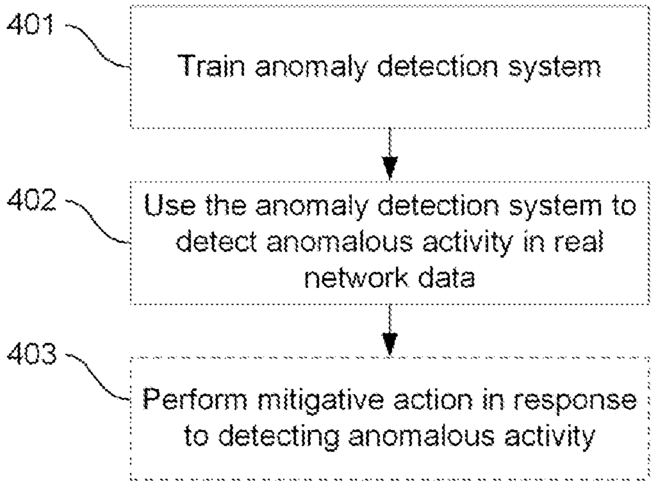
FIG. 4 is a flowchart of a method for detecting anomalous network activity.

FIG. 4 shows an anomaly detection method. In 401, an anomaly detection system (e.g. an intrusion detection system) is trained using the method of FIG. 3. In 402, the anomaly detection system is used to detect anomalous activity (e.g. malicious activity) in real-world network data. In optional 403, a mitigative action may be performed in response to detection of the anomalous activity. The mitigative action in question will depend upon the nature of the detected anomalous activity. Selection of an appropriate mitigation action could use any suitable technique, such as rule-based methods (e.g. using a lookup table), heuristic methods, or machine learning methods (e.g. using a machine learning intrusion response system).

The preceding description is presented to enable any person skilled in the art to make and use the system and/or perform the method of the disclosure and is provided in the context of a particular application. Various modifications to the disclosed examples will be readily apparent to those skilled in the art. It is intended that the specification be considered as exemplary only.

Where this application lists one or more method operations, the presence of precursor, follow-on and intervening method operations is not excluded unless such exclusion is explicitly indicated. Similarly, where this application lists one or more components of a device or system, the presence of additional components, whether separate or intervening, is not excluded unless such exclusion is explicitly indicated.

In addition, where this application has listed the operations of a method or procedure in a specific order, it could be possible, or even expedient in certain circumstances, to change the order in which some operations are performed, and it is intended that the particular operations of the method or procedure claims set forth herein not be construed as being order-specific unless such order specificity is expressly stated in the claims. That is, the operations may be performed in any technically feasible order, unless otherwise specified, and embodiments may include additional or fewer operations than those disclosed herein. It is further contemplated that executing or performing a particular operation before, partially or entirely contemporaneously with, or after another operation is in accordance with the described embodiments.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. Such a computer program may be embodied as source code or undergo compilation for implementation on a processing device, apparatus or system or may be embodied as object code, for example.

Such a computer program may be encoded as executable instructions embodied in a carrier medium, non-transitory computer-readable storage device and/or a memory device in machine or device readable form, for example in volatile memory, non-volatile memory, solid-state memory, magnetic memory such as disk or tape, optically or magneto-optically readable memory such as magnetic tape, compact disk (CD), digital versatile disk (DVD) or other media that are capable of storing code and/or data. Such a computer program may alternatively or additionally be supplied from a remote source embodied in a communications medium such as an electronic signal, radio frequency carrier wave or optical carrier wave. Such carrier media are also envisaged as aspects of the present disclosure.

Such instructions, when executed by a processor (or one or more computers, processors, and/or other devices) may cause the processor (the one or more computers, processors, and/or other devices) to perform at least a portion of the methods described herein.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, smartphones, tablets, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks, mice, gesture control devices and brain control (e.g. electroencephalography, EEG) devices. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. A network anomaly detection system comprising:
at least one processor and memory configured to:
generate synthetic benign network data and synthetic anomalous network data;
combine the synthetic benign network data and synthetic anomalous network data to generate combined synthetic network data having a predetermined density of anomalous network data;
provide the combined synthetic network data to a trained anomaly detection model;
determine an accuracy score representative of how accurately the trained anomaly detection model recognizes anomalous activity in the combined synthetic network data; and
performing one of:
responsive to determining that the accuracy score is less than a threshold value, train the anomaly detection model with additional network data and then repeat the providing, the determining, and the performing, or
reducing the predetermined density of anomalous network data and repeating the combining, the providing, and the determining until a predetermined stopping criterion is met.

2. The network anomaly detection system of claim 1, wherein the synthetic benign network data is generated using a generative data model with real-world benign network data.

3. The network anomaly detection system of claim 1, wherein the predetermined stopping criterion is a predetermined minimum density of anomalous network data.

4. The network anomaly detection system of claim 1, wherein training the anomaly detection model with additional network data comprises training the anomaly detection model with training data having the predetermined density of anomalous network data.

5. The network anomaly detection system of claim 1, further configured to use the anomaly detection model to detect anomalous activity in real network data subsequent to the training or the reducing.

6. The network anomaly detection system of claim 5, further comprising an anomaly response system configured to perform a mitigative action in response to detection of the anomalous activity.

7. A computer-implemented method of training a network anomaly detection system, the method comprising:
generating synthetic benign network data and synthetic anomalous network data;
combining the synthetic benign network data and synthetic anomalous network data to generate combined synthetic network data having a predetermined density of anomalous network data;
providing the combined synthetic network data to a trained anomaly detection model;
determining an accuracy score representative of how accurately the trained anomaly detection model recognizes anomalous activity in the combined synthetic network data; and
performing one of:
responsive to determining that the accuracy score is less than a threshold value, proceeding by training the anomaly detection model with additional network data and then repeating the providing, the determining, and the performing, or reducing the predetermined density of anomalous network data and repeating the combining, the providing, and the determining until a predetermined stopping criterion is met.

8. The method of claim 7, wherein the synthetic benign network data is generated by a generative data model using real-world benign network data.

9. The method of claim 7, wherein the predetermined stopping criterion is a predetermined minimum density of anomalous network data.

10. The method of claim 7, wherein training the anomaly detection model with additional network data comprises training the anomaly detection model with training data having the predetermined density of anomalous network data.

11. A computer-implemented anomaly detection method comprising:

training a network anomaly detection system using the method of claim 7; and subsequent to training the network anomaly detection system, using the network anomaly detection system to detect anomalous activity in real network data.

12. The method of claim 11, further comprising performing a mitigative action in response to detecting the anomalous activity.

13. The network anomaly detection system of claim 1, wherein the network anomaly detection system is an intrusion detection system.

14. The method of claim 7, wherein the network anomaly detection system is an intrusion detection system.

15. A non-transitory computer-readable storage medium storing a computer program comprising instructions which, when executed by a computer, cause the computer to carry out the method of claim 7.

* * * * *